US00RE40622E

(19) United States
(12) Reissued Patent
Lu

(10) Patent Number: US RE40,622 E
(45) Date of Reissued Patent: Jan. 13, 2009

(54) DOUBLE FERRULE SC CONNECTOR AND ADAPTER

(75) Inventor: Liang-Ju Lu, Eden Prairie, MN (US)

(73) Assignee: ADC Telecommunications, Inc., Eden Prairie, MN (US)

(21) Appl. No.: 10/032,516

(22) Filed: Oct. 26, 2001

(Under 37 CFR 1.47)

Related U.S. Patent Documents

Reissue of:
(64) Patent No.: 5,971,625
Issued: Oct. 26, 1999
Appl. No.: 08/906,919
Filed: Aug. 6, 1997

U.S. Applications:
(63) Continuation of application No. 08/720,764, filed on Oct. 3, 1996, now Pat. No. 5,692,080.

(51) Int. Cl.
*G02B 6/38* (2006.01)

(52) U.S. Cl. ..... 385/60; 385/55; 385/72; 385/78

(58) Field of Classification Search ..... 385/53, 385/55, 56, 59, 60, 71, 72, 75, 78, 92, 58, 385/70
See application file for complete search history.

(56) References Cited

U.S. PATENT DOCUMENTS 4,611,887 A * 9/1986 Glover et al. ..... 385/71
5,016,968 A * 5/1991 Hammond et al. ..... 385/78
5,123,071 A * 6/1992 Mulholland et al. ..... 385/53
5,166,995 A * 11/1992 Briggs et al. ..... 385/58
5,317,663 A * 5/1994 Beard et al. ..... 385/70
5,333,221 A * 7/1994 Briggs et al. ..... 385/55
5,335,301 A * 8/1994 Newman et al. ..... 385/75
5,337,385 A * 8/1994 Baderschneider et al. ..... 385/59
5,577,146 A * 11/1996 Musk ..... 385/92
5,692,080 A * 11/1997 Lu ..... 385/60

OTHER PUBLICATIONS

Circle No. 4, Light Wave magazine, advertisement for AMP Corporation products, Aug. 1996.*
Circle 198, magazine advertisement for Methode Electronic Inc., (date unknown).*
Amendment filed in response to Mar. 20, 1997 Office Action in U.S. App. No. 08/720,764, (Apr. 29, 1997).*

* cited by examiner

*Primary Examiner*—Hemang Sanghavi
(74) *Attorney, Agent, or Firm*—Merchant & Gould P.C.

(57) ABSTRACT

A fiber optic connector has two ferrules contained within a single connector housing with the ferrules positioned in parallel, spaced-apart alignment. The connector includes a first mating fastener exposed on exterior sides of the connector housing. A fiber optic adapter has an open end to slidably receive the connector housing. The adapter includes two parallel sleeves contained within the adapter housing and aligned with the ferrules of the connector. The adapter includes a second mating fastener exposed to an interior of the adapter housing to releasably mate with the first mating fastener when the connector housing is in the full insert position.

22 Claims, 10 Drawing Sheets

DOUBLE FERRULE SC CONNECTOR AND ADAPTER

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of U.S. patent application Ser. No. 08/720,764, filed Oct. 3, 1996 now U.S. Pat. No. 5,692,080.

BACKGROUND OF THE INVENTION

1. Field of the Invention

This invention pertains to fiber optic connectors and adapters for coaxially connecting fiber optic cables. More particularly, this invention pertains to an adapter to accept two ferrules to double the density of connections.

2. Description of the Prior Art

Fiber optics have revolutionized telecommunications throughout the world. With the increased use of fiber optics, it is increasingly important to be able to connect and disconnect fiber optic cables from various sources. Two fiber optic cables can be optically coupled so that they are in communication with one another by using well-known SC connectors and an SC adapter thereby putting each fiber optic cable in communication with the other. The SC connectors are placed on the end of each cable and then plugged into the adapter. The adapter has two openings, each one designed to receive a connector.

An example of an SC adapter and connector are shown in commonly assigned U.S. Pat. No. 5,317,663 to Beard, et al. dated May 31, 1994. In the '663 patent, the adapter is shown in FIG. 4 and the connector is shown in FIG. 3. The disclosure of the '663 patent is incorporated herein by reference.

Fiber optic connectors are commonly organized such that two adjacent connectors and adapters perform transmit and receive functions, respectively, in the fiber optic circuit. Historically, such separate transmit and receive connectors and adapters would be positioned in close proximity. The prior art has developed so-called duplex adapters where transmit and receive connectors are joined. An example of such is a Single Mode Duplex SC and Multi Mode Duplex SC of Amp Corporation. Such prior art duplex SC connectors require a substantially increased volume over single SC connectors such as that shown in U.S. Pat. No. 5,317,663. It is desirable to increase the density of connectors in a telecommunications plant. It is the object of the present invention to provide a dual SC connector and adapter requiring no greater area than that required by the single SC connector and adapter shown in U.S. Pat. No. 5,317,663.

SUMMARY OF THE INVENTION

According to a preferred embodiment of the present invention, an optical fiber connector assembly includes a fiber optic connector and a fiber optic adapter. The connector includes a connector housing having a leading end. A first and second ferrule are contained within the connector housing. The first and second ferrules are positioned in parallel, spaced-apart alignment at the leading end. Also, the ferrules have exposed ends at the leading end of the connector housing. The connector housing includes a first mating fastener exposed on exterior sides of the connector housing. The adapter includes an adapter housing having an open end sized to slidably receive the leading end of the connector housing. The connector housing moves within the adapter housing to a full insert position. The adapter housing contains first and second parallel sleeves which are positioned to slidably receive respective ones of the first and second ferrules as the connector housing is moved to the full insert position. The adapter housing includes a second mating fastener exposed to an interior of the adapter housing to releasably mate with the first mating fastener when the connector housing is in the full insert position.

DESCRIPTION OF THE PREFERRED EMBODIMENT

With reference now to the several drawing figures in which identical elements are numbered identically throughout, a description of the preferred embodiment of the present invention will now be provided.

Figure 1:
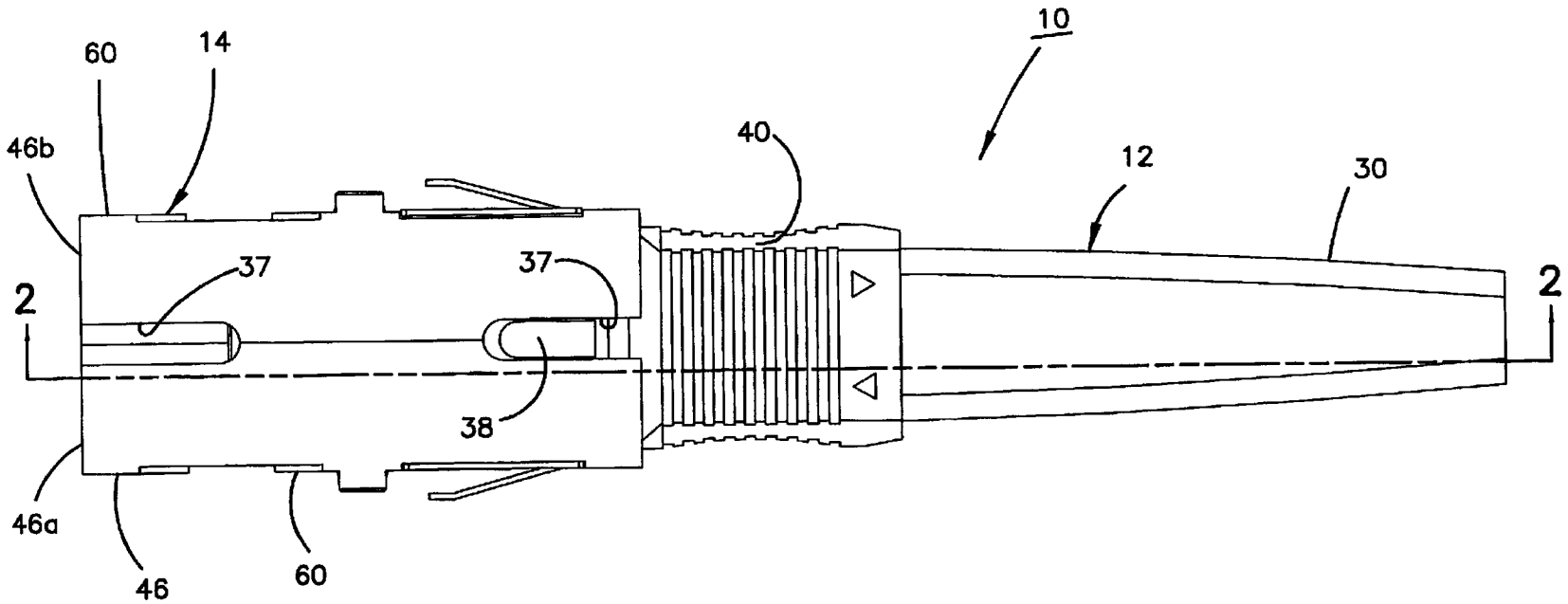
FIG. 1 is a plan view of an adapter according to the present invention coupled to a connector according to the present invention to form a connector/adapter assembly according to the present invention.
Figure 2:
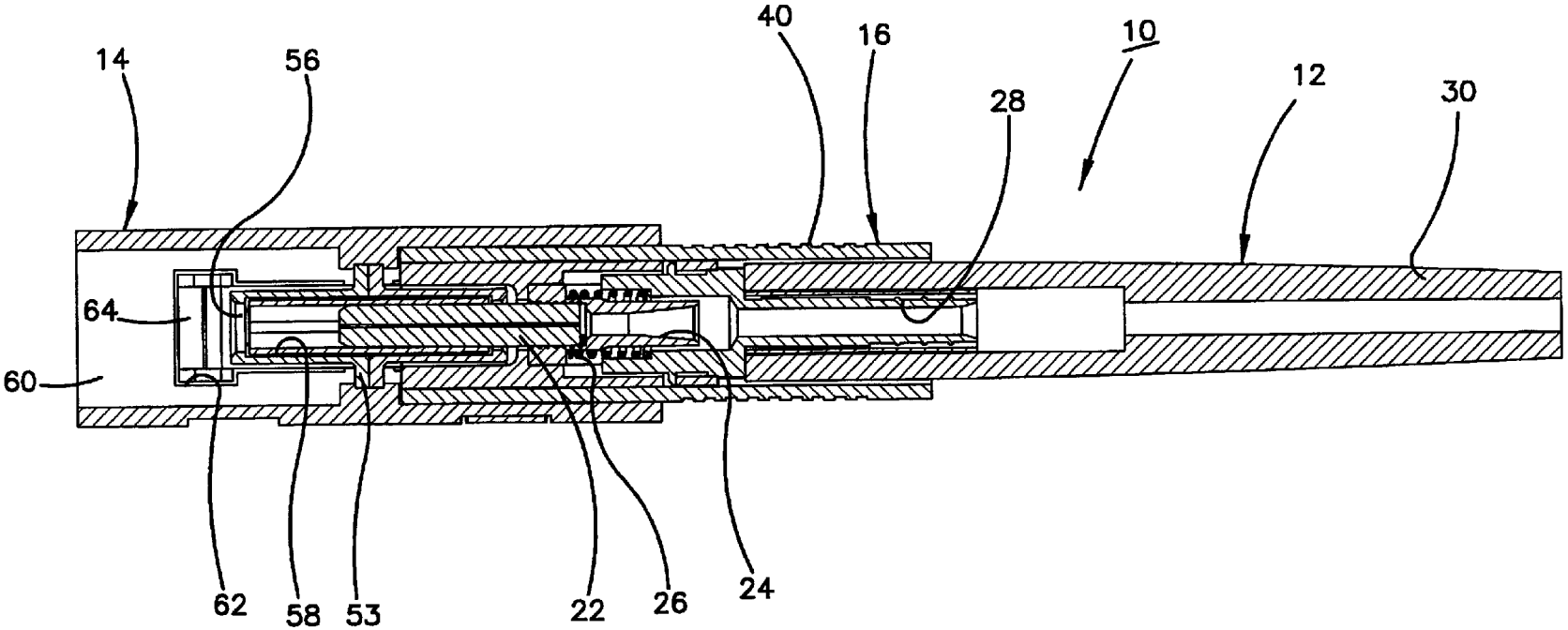
FIG. 2 is a view taken along line 2—2 of FIG. 1.
Figure 3:
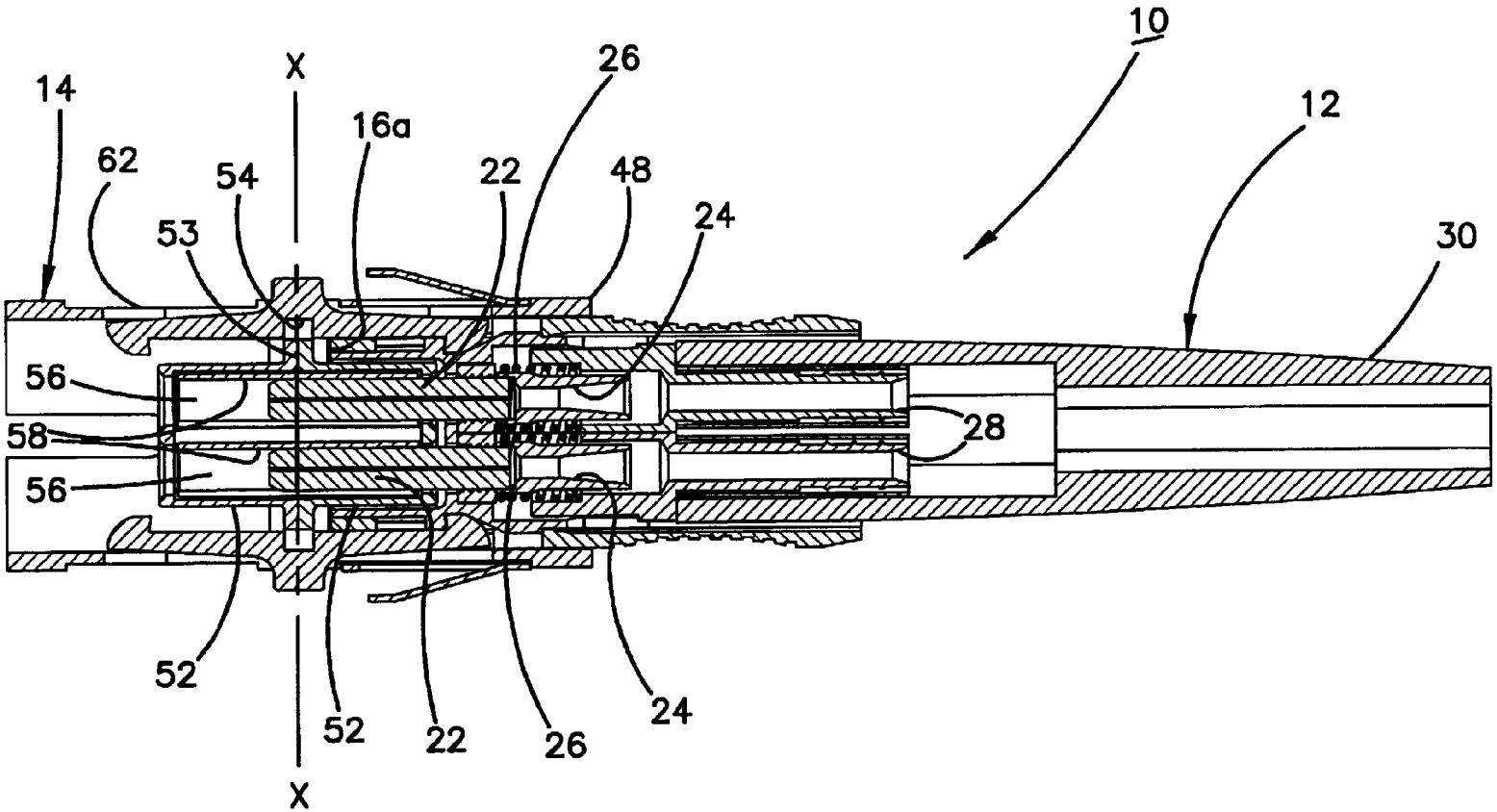
FIG. 3 is a cross-sectional longitudinal view of the assembly of FIG. 1 rotated 90° from the view of FIG. 2.

With initial reference to FIGS. 1–3, a fiber optic connector/adapter assembly 10 includes a fiber optic connector 12 and a fiber optic adapter 14. Single ferrule fiber optic connectors and adapters are shown in commonly assigned U.S. Pat. No. 5,317,663 incorporated herein by reference. Such adapters include openings for receiving two connectors in order to optically couple the connectors. In FIGS. 1–3, only a single connector 12 is shown inserted into the adapter 14 for purposes of clarity. It will be appreciated that, in use, two connectors 12 will be coupled to a single adapter 14 in order to optically couple the two connectors 12.

Figure 4:
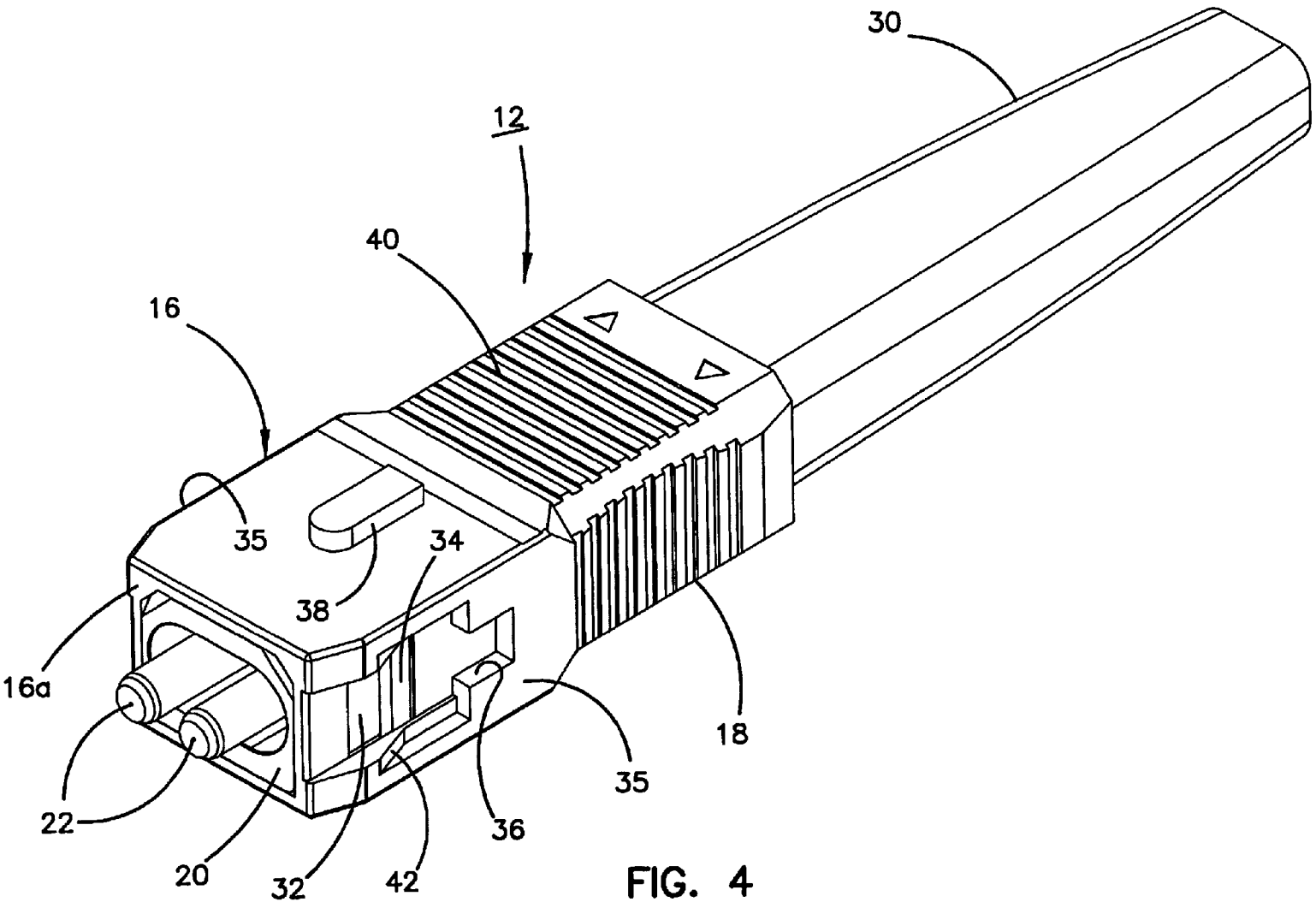
FIG. 4 is a front, top, and side perspective view of a connector according to the present invention.
Figure 5:
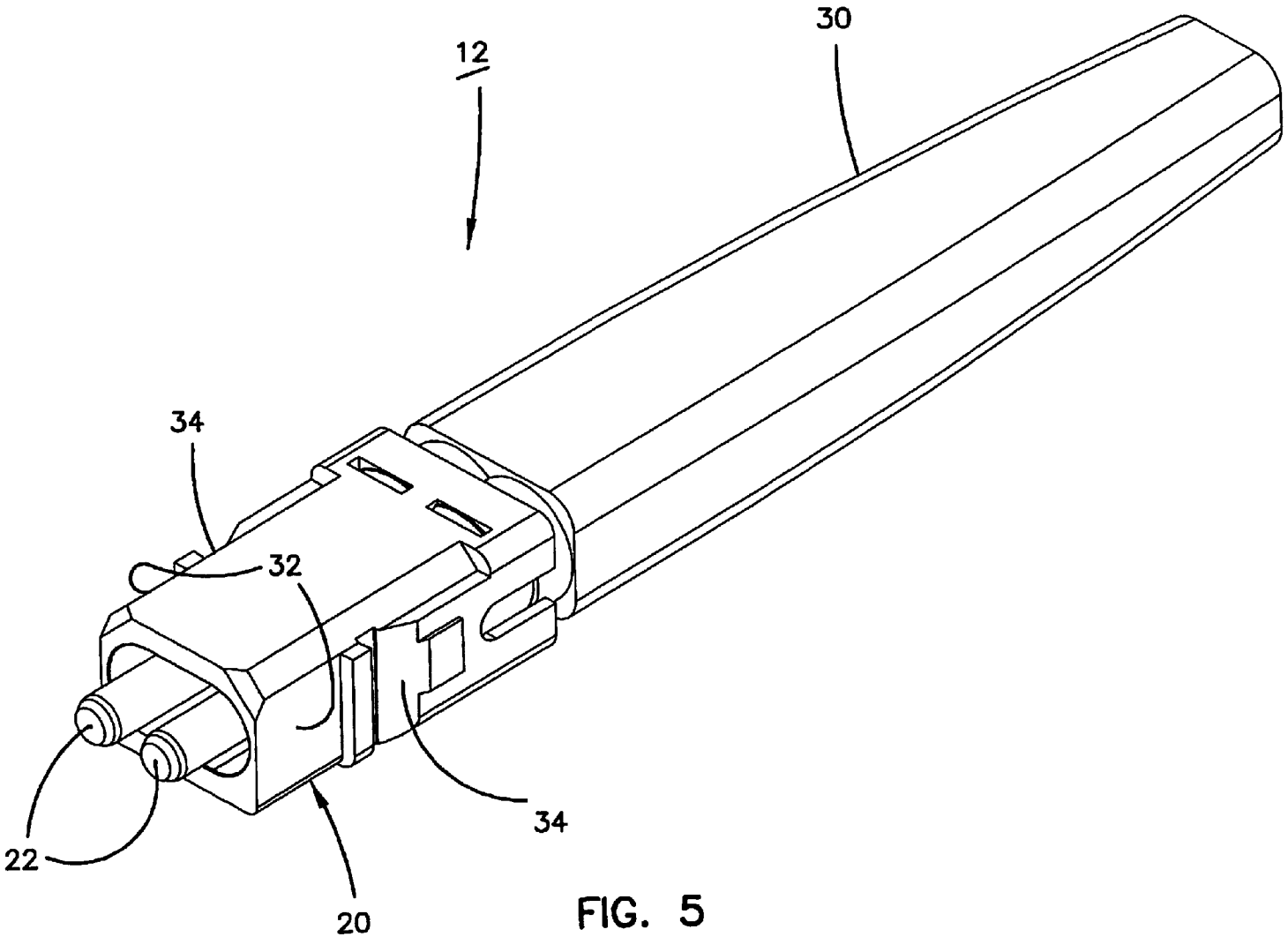
FIG. 5 is the view of FIG. 4 with an outer housing of the connector removed to expose an interior housing.
Figure 6:
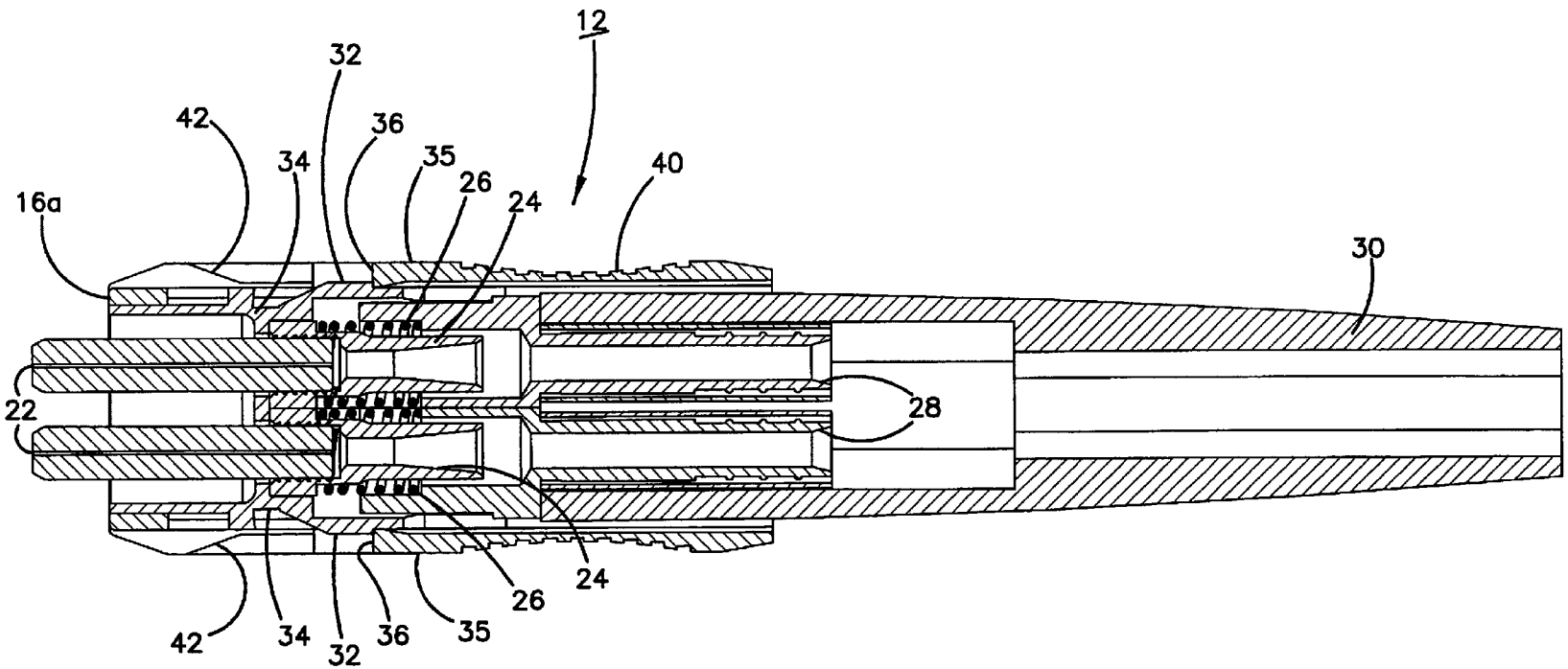
FIG. 6 is a longitudinal cross-sectional view of the connector of FIG. 4.
Figure 7:
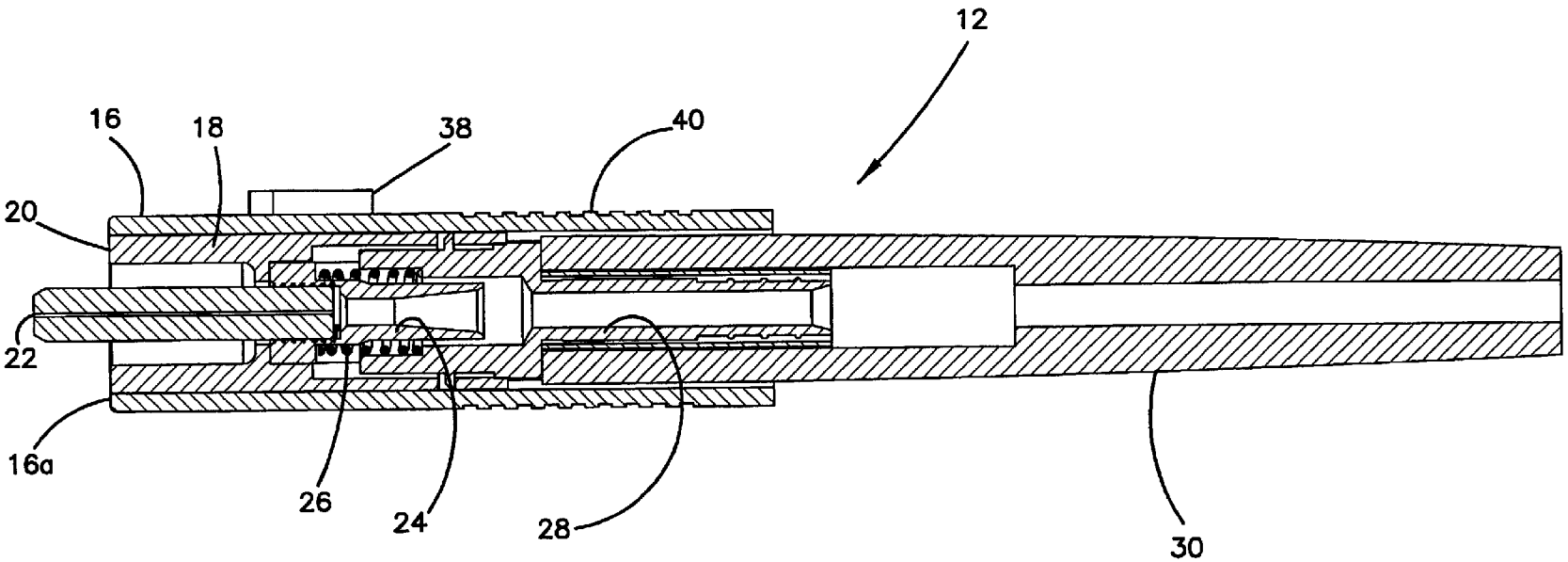
FIG. 7 is the view of FIG. 4 rotated 90°.
Figure 8:
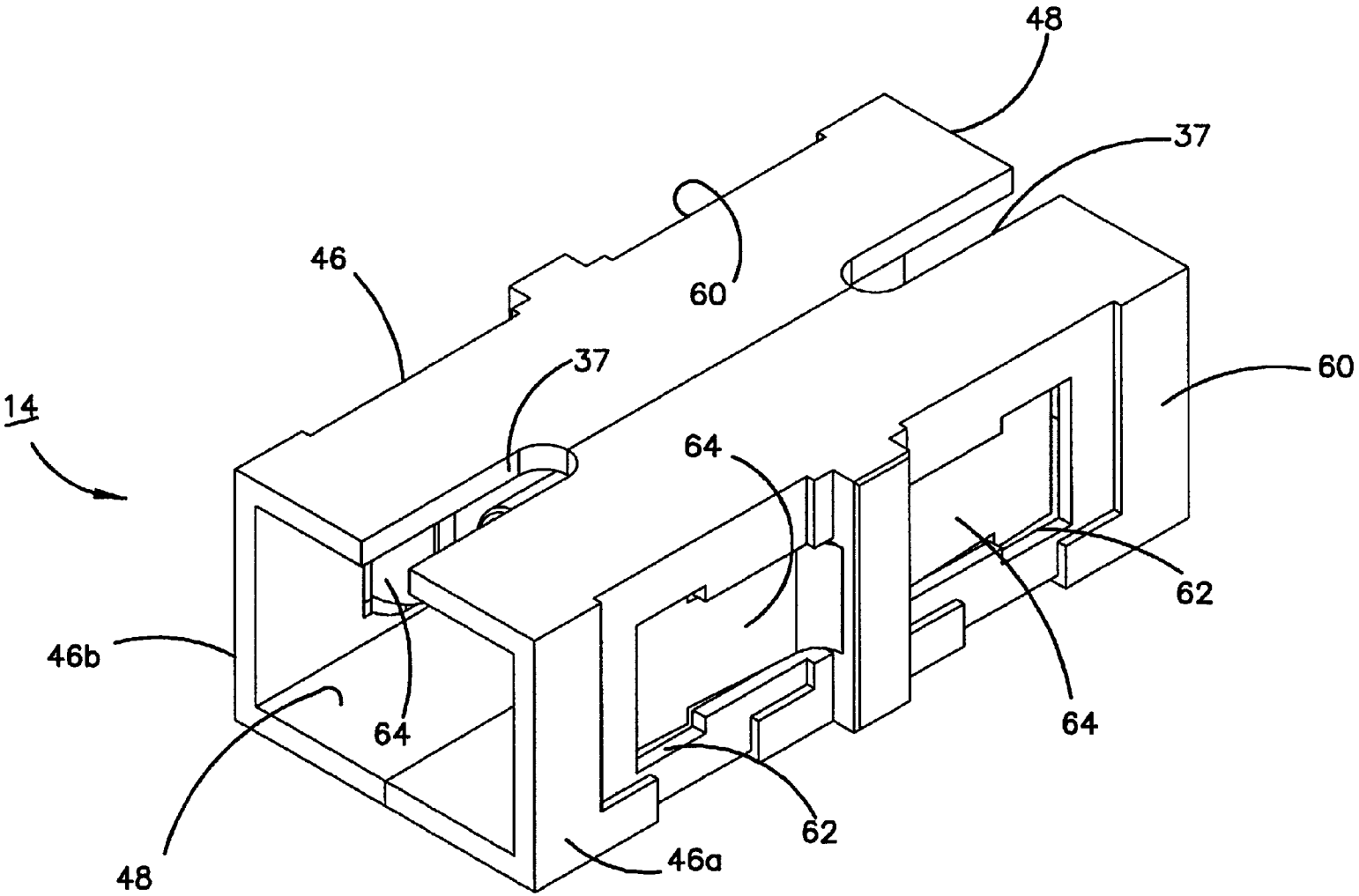
FIG. 8 is a perspective view of an adapter of the present invention.

The connector 12 is separately shown in FIGS. 4–7. Shown best in FIGS. 4 and 5, the connector 12 includes a connector housing 16 formed by an outer housing 18 slidably received over an inner housing 20. In FIG. 5, the outer housing 18 is not shown so that the inner housing 20 may be clearly illustrated. In FIG. 4, 6 and 7, the outer housing 18 is shown over the inner housing 20.

Two ferrules 22 are contained within the inner housing 20 with the ferrules 22 mounted in parallel, spaced-apart alignment. Ends of the ferrules 22 extend beyond a leading end 16a of the housing 16.

Each of the ferrules 22 is mounted in a hollow ferrule hub 24. The hubs 24 and attached ferrules 22 are slidably move-able within the inner housing 20 in a direction coaxial with the longitudinal axes of the ferrules 22. Hubs 24 may be keyed to inner housing 20 to restrict rotation of hubs 24.

Springs 26 surround the hubs 24 with the springs 26 urging the ferrules 22 outwardly from the leading end 16a. Each of the ferrules 22 and springs 26 are independent such that each of the ferrules 22 is separately urged outwardly from leading end 16a.

The inner housing 20 further includes a mandrel 28 onto which a fiber optic cable (not shown) may be attached. The fiber optic cables are not shown in the figures, but such a cable would include a narrow or thin optical fiber which would extend within the axial bore of the ferrules 22. Such cables would also include sheathing to be secured to the mandrels 28. A strain relief jacket 30 surrounds the mandrel 28 and is secured to the inner housing 20.

The inner housing 20 includes opposite side walls 32 (FIG. 5) having an exposed detent 34 with the two detents 34 positioned on opposite sides of the inner housing 20. The outer housing 18 includes opposite side walls 35 (FIG. 4) having cutouts 36 such that the side walls 32 and detents 34 are exposed through the side walls 35. Therefore, the detents 34 are exposed on exterior sides of the connector housing 16. The outer housing 18 further includes a guiding tab 38 and a knurled handle 40. The side walls 35 further include a ramp or cam surface 42 in the region of the cutout 36 and positioned adjacent the detents 34.

Figure 9:
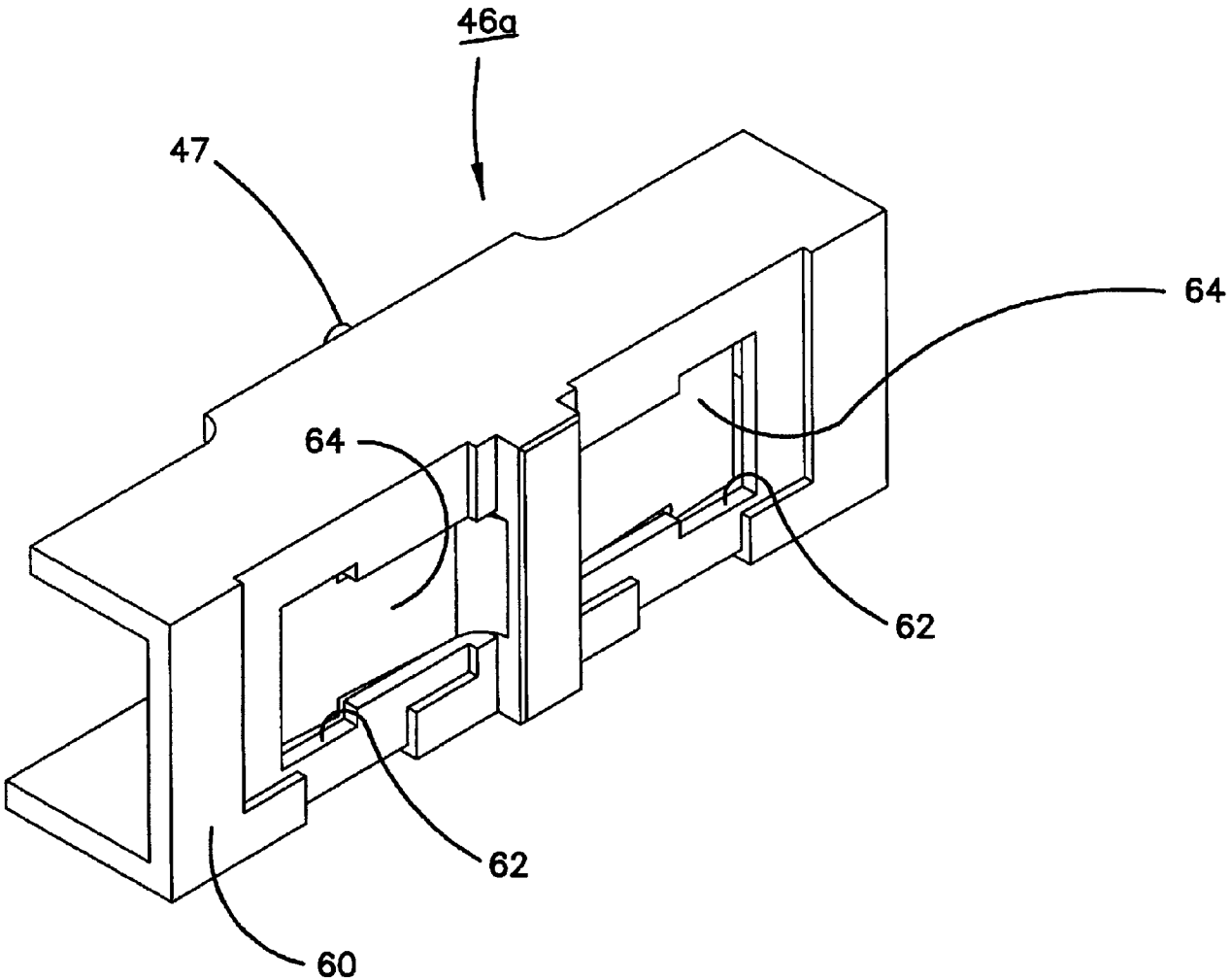
FIG. 9 is a perspective view of a first mating half of a housing of the adapter shown in FIGS. 1–3.
Figure 10:
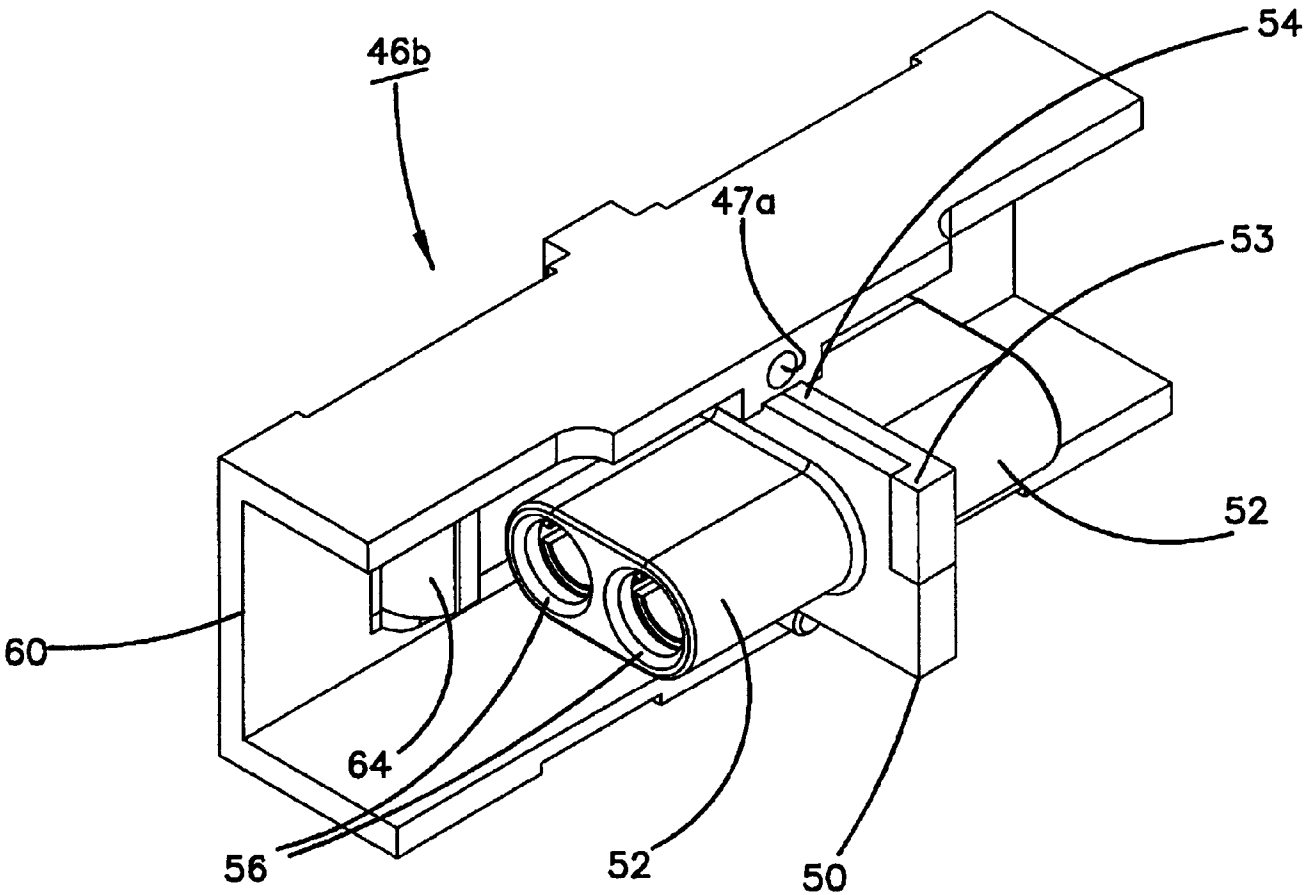
FIG. 10 is a perspective view of a second mating half of an adapter housing containing a sleeve sub-assembly.

The adapter 14 is shown in FIGS. 1–3. The adapter includes an adapter housing 46 formed of identical mating halves 46a, 46b. A single adapter housing mating half 46a is shown separately in FIG. 9. Half 46b is separately shown in FIG. 10. The adapter housing 46 includes side walls 60 opposing the outer side walls 32, 35 of the outer housing 18 and inner housing 20. Pins 47 are added to the half 46a aligned with a hole 47a on half 46b so that halves 46a, 46b may be joined to form a complete housing 46. The pins 47 permit alignment so that a seam between halves 46a, 46b may be ultrasonically welded.

The adapter 14 is symmetrical relative to a transverse axis X—X (FIG. 3). For purposes of this description of the preferred embodiment, a description of the side of adapter 14 to receive connector 12 (i.e., to the right of axis X—X in FIG. 3) will be described. It will be appreciated that the opposite side of adapter 14 (i.e., to the left of axis X—X in FIG. 3) is identical in construction to receive a similar connector 12.

The adapter housing 46 includes an open end 48 sized to slidably receive the leading end 16a of the connector housing 16. Exterior surfaces of the outer connector housing 18 are complementarily shaped to the interior surface of the adapter housing 46 so that housing 18 is in close tolerance to housing 46 and is guided by housing 46 as housing 18 is inserted. The connector housing 16 moves toward a full insert position shown in FIGS. 1–3 along a path of travel parallel to the ferrules 22. The housing 46 has a slot 37 to receive tab 38.

A sleeve subassembly 50 is contained within an interior of the adapter housing 46. The sleeve subassembly 50 includes identical mating halves 52 joined to define a flange 53. The flange 53 is received within a mating groove 54 of the adapter housing 46. The subassembly mating halves 52 define two parallel bores 56 formed therethrough aligned with the ferrules 22. Two ferrule sleeves 58 are retained within the bores 56. The sleeves 58 are positioned to slidably mate with the ferrules 22 when the connector 12 is inserted into the adapter 14 to the full insert position shown in FIGS. 1–3.

As shown in FIGS. 2 and 3, when a single connector 12 is inserted into the adapter 14 to the full insert position, the terminal ends of the ferrules 22 extend beyond the axis X—X. When a second connector is inserted into the opposite side of the adapter 14, the ferrules of the second connector will abut the ferrules 22 of the first connector 12. The springs 26 will permit the ferrules 22 to move away from axis X—X and reach an equilibrium point such that opposing ferrules will be in face-to-face abutting engagement at a part line along axis X—X. The sleeves 58 maintain the opposing ferrules in coaxial alignment such that opposing ferrules are provided with their contained optical fibers being optically aligned and coupled.

The adapter housing side walls 60 are provided with cutouts 62. Contained within the cutouts 62 are cantilevered clips 64. Cantilevered clips 64 are positioned to be received within the detents 34 when the connector 12 is inserted into the adapter 14 at the full insert position. Further, the cam surface 42 of outer housing 18 opposes the clips 64 Accordingly, when the outer housing 18 is moved in a parting or separating direction relative to the inner housing 20, the cam surface 42 engages the clips 64 moving the clips 64 outwardly to free the clips 64 from the detents 34 permitting removal of a connector 12 from the adapter 14 It will be noted that by providing the cutouts 62, the clips 64 may expand at least partly into the side walls 60.

With respect to the structure shown in U.S. Pat. No. 5,317,663, the adapter of the prior art includes solid side walls. A sleeve subassembly includes clips contained completely within the interior of the adapter such that the clips remain completely within the interior of the adapter as the clips are deflected in response to a connector inserted into the adapter.

In the present invention, the clips 64 are moved to the exterior walls of the adapter such that the clips 64 may partially deflect into the exterior walls 60 of the adapter 14 This arrangement greatly increases the available volume within the adapter 14 such that two ferrules 22 may be inserted into the adapter 14 of the present invention while only a single ferrule could be inserted into the adapter of the prior art shown in U.S. Pat. No. 5,317,663 thereby doubling the density. Accordingly, for an adapter 14 having identical external dimensions (i.e., "footprint") to that shown in U.S. Pat. No. 5,317,663, the present invention permits a doubling of the optical coupling within the adapter. The product of the '663 patent uses a standard 2.5 mm diameter ferrule. In the present invention, to achieve the same footprint either 1.25 mm or 2.5 mm diameter ferrules 22 can be used.

In addition to increasing the density of the optical coupling, two related fibers (i.e., namely transmit and receive fibers) can be simultaneously connected within a single adapter 14. This facilitates the connections made by a technician since only a single connection need be made in order to couple related transmit and receive fibers whereas a single SC adapter such as that shown in U.S. Pat. No. 5,317,663 requires two such connections per related transmit and receive fibers.

From the foregoing, it has been shown how the objects of the invention have been attained in a preferred manner Namely, with the same external volume as a prior art single SC adapter shown in U.S. Pat. No. 5,317,663, applicant has modified the adapters 14 and connectors 12 to permit two fibers to be simultaneously connected in a single adapter 14 having the same external volume of the prior art single adapter. This both increases the functionality and density of fiber optic connections over the prior art.

While the invention has been disclosed in a preferred embodiment, it will be appreciated that modifications and equivalents of the disclosed concepts such as those which readily occur to one skilled in the art shall be included within the scope of the claims which are appended hereto.

What is claimed is:

1. An optical fiber connector assembly comprising:

a. a fiber optic connector having:

i. a connector housing having a leading end;

ii. at least a first ferrule and a second ferrule contained within said connector housing with;

A. said first and second ferrules positioned in parallel, spaced-apart alignment at said leading end, and B. said ferrules having exposed ends at said leading end;

iii. said connector housing including a first mating fastener exposed on exterior sides of said connector housing, said first mating fastener including a clip receiving detent formed on exposed external surfaces of said connector housing;

b. a fiber optic adapter having:

i. an adapter housing having an open end sized to slidably receive said leading end of said connector housing with said connector housing moving toward a full insert position in a path of travel parallel to said ferrules;

ii. at least a first and a second parallel sleeves contained within said adapter housing and positioned for said first and second sleeves to slidably receive respective ones of said first and second ferrules as said connector housing is moved toward said full insert position;

iii. a second mating fastener including a clip on said adapter housing and exposed to an interior of said housing to releasably mate with said first mating fastener when said connector housing is moved to said full insert position; and iv. walls of said adapter housing having recesses at least partially formed therethrough, said clips at least partially disposed within said recesses and said clips movable into said recesses as said clips are deflected in response to insertion of said leading end of said connector housing into said adapter housing.

2. An assembly according to claim 1 wherein:

said adapter housing includes substantially identical first and second halves each having an individual one of said external clips.

3. An assembly according to claim 2 wherein:

said sleeves are supported in a sleeve sub-assembly having means for securing said sub-assembly within said adapter housing as said first and second halves are joined together.

4. An assembly according to claim 3 wherein said sub-assembly includes:

a sleeve housing having first and second parallel bores formed therethrough;

said first and second sleeves retained within respective ones of said bores;

said sleeve housing having a flange received within a groove formed in said first and second halves.

5. An assembly according to claim 1 wherein:

said first and second ferrules are slidable independent of one another within said connector housing in a sliding path parallel to longitudinal axes of said ferrules.

6. An assembly according to claim 5 further comprising:

first and second spring means for separately urging said first and second ferrules outwardly from said leading end.

7. An assembly according to claim 1 wherein:

said connector housing includes an internal housing slidably received within an external housing;

said first mating fastener disposed on said internal housing;

said external housing having an opening formed therethrough to expose said first mating fastener.

8. An assembly according to claim 7 wherein:

said external housing includes release means for releasing said first and second mating fasteners upon separating, sliding movement of said external housing relative to said internal housing.

9. A fiber optic connector for releasably coupling with a fiber optic adapter where said adapter includes, a. an adapter housing having an open and exposing an adapter interior;

b. at least a first and a second parallel sleeves contained within said adapter housing and positioning with open ends of said first and second sleeves exposed to said open end of said adapter housing; and c. an adapter mating fastener including clips on said adapter housing and exposed to said adapter interior;

said connector comprising:

a. a connector housing having a leading end sized to be received with said adapter open end;

b. at least a first ferrule and a second ferrule contained within said connector housing with;

i. said first and second ferrules positioned in parallel, spaced-apart alignment at said leading end, and ii. said ferrules having exposed ends at said leading end and positioned to be slidably received in respective one of said first and second sleeves as said connector housing is inserted into said adapter interior through said adapter open end;

b. said connector housing including a connector mating fastener exposed on exterior sides of said connector housing to releasably mate either said adapter mating fastener as said connector housing is inserted into said adapter interior through said adapter open end; and c. said connector mating fastener including clip receiving detents on exposed external surfaces of said connector housing and positioned to mate with said clips when said connector housing is inserted into said adapter to a full insert position.

10. A connector according to claim 9 wherein:

said first and second ferrules are slidable independent of one another within said adapter housing in a sliding path parallel to longitudinal axes of said ferrules.

11. A connector according to claim 10 further comprising:

first and second spring means for separately urging said first and second ferrules outwardly from said leading end.

12. A connector according to claim 9 wherein:

said connector housing includes an external housing slidably received within an external housing, said connector mating fastener disposed on said internal housing;

said external housing having an opening formed therethrough to expose said first mating fastener.

13. A connector according to claim 12 wherein:

said external housing includes release means for releasing said first and second mating fasteners upon separating, sliding movement of said external housing relative to said internal housing.

14. An fiber optic adapter for releasably coupling with a fiber optic connector where said connector includes:

a. a connector housing having a leading end;

b. at least a first ferrule and a second ferrule contained within said connector housing with;

i. said first and second ferrules positioned in parallel, spaced-apart alignment at said leading end, and ii. said ferrules having exposed ends at said leading end;

c. said connector housing including a first mating fastener exposed on exterior sides of said connector housing, said first mating fastener including clip receiving detents formed on exposed external surfaces of said connector housing;

said adapter comprising:

a. an adapter housing having an open end sized to slidably receive said leading end of said connector housing with said connector housing moving toward a full insert position in a path of travel parallel to said ferrules;

b. at least a first and a second parallel sleeves contained within said adapter housing and positioned for said first and second sleeves to slidably receive respective ones of said first and second ferrules as said connector housing is moved toward said full insert position;

c. a second mating fastener exposed to an interior of said adapter housing to releasably mate with said first mating fastener when said connector housing is moved to said full insert position;

d. said second mating fastener including clips on said adapter housing positioned to mate with said detents as said connector housing is inserted into said open end of said adapter housing to a full insert position; and e. walls of said adapter housing including recesses at least partially formed therethrough sized to receive said clips as said clips are deflected in response to insertion of said leading end of said connector housing into said adapter housing.

15. An adapter according to claim 14 wherein said adapter housing includes substantially identical first and second halves each having an individual one of said external clips.

16. An adapter according to claim 15 wherein said sleeves are supported in a sleeve sub-assembly having means for securing said sub-assembly within said adapter housing as said first and second halves are joined together.

17. An adapter according to claim 16 wherein said sub-assembly includes:

a sleeve housing having first and second parallel bores formed therethrough;

said first and second sleeves retained within respective ones of said bores;

said sleeve housing having a flange received within a groove formed in said first and second halves.

*18. An optical fiber connector assembly comprising:*

*a. a fiber optic connector having a connector housing, the connector housing including a leading end, and first and second ferrules adjacent to the leading end of the connector housing;*

*b. a fiber optic adapter having an adapter housing, the adapter housing having a central open end, and first and second sleeves positioned to communicate with the open end;*

*1. the first and second sleeves positioned parallel to one another;*

*2. the first and second sleeves positioned and sized to receive respective ones of the first and second ferrules as the connector housing is fully inserted into a full insert position; and*

*3. the open end having an outer perimeter defining an SC footprint.*

*19. The optical fiber connector assembly of claim 18 further comprising a clip arrangement for releasably mating the connector to the adapter.*

*20. The optical fiber connector assembly of claim 18 wherein the adapter housing includes an exterior flange, and further comprising an exterior clip on the adapter housing, the clip spaced from the exterior flange.*

*21. The optical fiber connector assembly of claim 18 wherein the open end is a first open end, wherein the adapter housing includes a second open end opposite the first open end, wherein the second open end is sized for receiving a second fiber optic connector including a second connector housing, the second connector housing including a leading end, and first and second ferrules adjacent to the leading end of the second connector housing of the second fiber optic connector.*

*22. A fiber optic adapter for use with a single fiber optic connector having a connector housing including a leading end, and first and second ferrules adjacent to the leading end, the fiber optic adapter comprising:*

*a. an adapter housing having a central open end, and first and second sleeves positioned to communicate with the open end;*

*1. the first and second sleeves positioned parallel to one another;*

*2. the first and second sleeves positioned and sized to receive respective ones of the first and second ferrules as the connector housing is fully inserted into a full insert position;*

*3. the open end having an outer perimeter defining an SC footprint; and*

*b. a clip for releasably connecting to the connector housing.*

* * * * *

UNITED STATES PATENT AND TRADEMARK OFFICE

CERTIFICATE OF CORRECTION

PATENT NO. : RE 40,622 E
APPLICATION NO. : 10/032516
DATED : January 13, 2009
INVENTOR(S) : Lu It is certified that error appears in the above-identified patent and that said Letters Patent is hereby corrected as shown below:

Col. 3, line 50: "interior surface of the" should read --interior surfaces of the--

Col. 6, line 16, claim 9: "an open and exposing an" should read --an open end exposing an--

Col. 6, line 49, claim 10: "said adapter housing in a sliding" should read --said connector housing in a sliding--

Signed and Sealed this

Fifth Day of January, 2010

David J. Kappos

David J. Kappos
*Director of the United States Patent and Trademark Office*